Dec. 31, 1946.　　　　E. C. BIERMAN　　　　2,413,600

METHOD OF MAKING RETICLES

Filed June 23, 1942

Everett C. Bierman,
Inventor.

By Warley L. Parrott
his Attorney.

Patented Dec. 31, 1946

2,413,600

UNITED STATES PATENT OFFICE 2,413,600

METHOD OF MAKING RETICLES

Everett C. Bierman, Charlotte, N. C., assignor to Semagraph Company, Charlotte, N. C., a corporation of Delaware Application June 23, 1942, Serial No. 448,114

2 Claims. (Cl. 95—5)

My invention relates to reticles and more particularly to an improved, photographic, method of producing reticles on glass. Such reticles are adaptable for use in telescopes, gun sights and various optical instruments.

The most common present method of making reticles involves the time consuming and meticulous task of engraving the design in metal, by hand or machine, or the etching of the design with hydrofluoric acid. My invention avoids all of the disadvantages and limitations of these prior practices by eliminating entirely the engraving and etching procedures.

One of the characterizing and commercially advantageous features of my invention is the exclusively photographic method for producing the reticles on glass without the necessity of etching or engraving the glass. The reticle lines photographed on the glass are markedly resistant to handling. Also, they are resistant to a number of optical cleaning agents including denatured alcohol.

Another valuable feature of my invention is the manufacture of reticles in multiple from a master photographic plate that enables quantity production of the reticles in a relatively very short time. This procedure constitutes a marked improvement over the prior methods of making individual reticles in such a manner that each reticle requires repetition of the complete process.

In accordance with my invention, I produce the reticles by making or obtaining a photograph of the original reticle design and then by relatively rapid, consecutive, photographic exposures I make a number of photographic reproductions on glass or film, to produce a master, photographic negative, having a plurality of the reticles located in spaced relationship. This master negative may then be used for producing simultaneously by photographic contact printing, a duplicate series of positive prints on a single glass plate or upon a plurality of separate glass disks. The separate glass disks may be previously cut and ground to the size and shape necessary for ultimate use in the optical device. Where a single glass plate is used the reticles produced thereon in spaced relationship are subsequently cut out to form individual disks.

In preparing the first single photographic negative from the original drawing or other illustration of the reticle, a process camera or contact printing may be used. This original negative may then be printed to make a positive on film or glass. To produce a master negative this positive is photographed a number of times onto a glass or film and the negatives spaced properly to enable subsequent positive photographic reproduction onto the final glass plate or glass disks. This multiple photographing to produce the master negative, is done by means of a photocomposing machine having the conventional means to move the machine laterally and vertically in stepwise manner and thereby produce a large number of photographic negatives in proper spaced relationship.

When desired, the reverse photographic procedure may be used; that is, the original negative rather than the original positive may be employed in the photocomposing machine to produce the reticles on the master plate as photographic positives.

The details of construction and mode of operation will be understood from the following description taken in conjunction with the accompanying drawing, in which.

Figure 1:
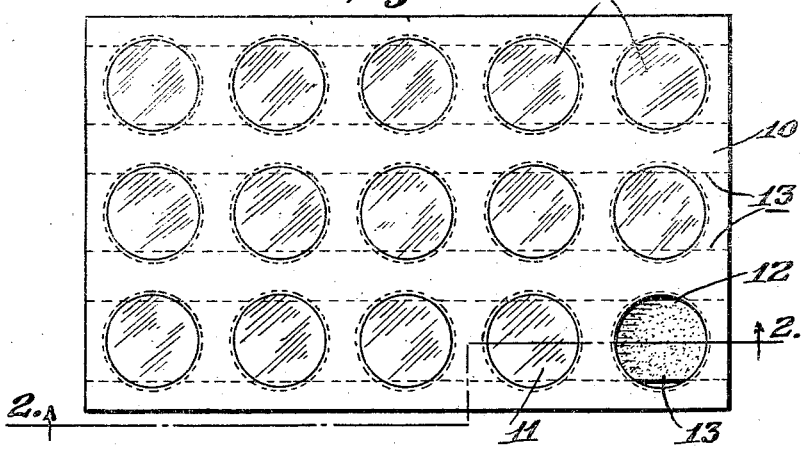
Fig. 1 is a top plan view of an illustrative form of reticle holder, showing transparent, preshaped, circular, reticle blanks placed in the holder cavities preparatory to having the reticles photographically produced thereon, one of the cavities being vacant to show more clearly the form thereof.
Figure 2:
Fig. 2 is a view partly in side edge elevation and partly in longitudinal section on the line 2—2 of Fig. 1.

Referring now to the drawing, the numeral 10 designates one type of suitable holder for individual circular glass disks 11 on which the reticles are to be photographed. The holder, as shown, is rectangular, preferably made of metal, although any other suitable material may be used, and provided with a multiplicity of circular, beveled recesses 12. The recesses are of proper size and shape to receive the respective individual disks 11 with a snug fit. The holder 10 is of substantially the same thickness as the glass disks 11 so that the inserted disks will be approximately flush with the top face of the holder. Adhesive strips, shown at 13, may be used to retain, releasably, the disks in the recesses.

The photographic method, referred to above and now to be described more in detail, which produces the reticle design on the disks, is both expeditious and economical and enables accurate reproduction in large quantities.

In carrying out this method, the original master negative or positive is placed in direct contact and in registry with the disks 11 and the reticles are photographically reproduced simultaneously onto the plurality of glass disks 11 in the holder 10. When a master negative is used it may have the same number of reticles and in the same group arrangement as the disks 11 so that they will register with the disks 11 which are placed in the several receptacles 12 and have been previously coated on their top faces with some suitable light sensitive photographic material.

Figure 3:
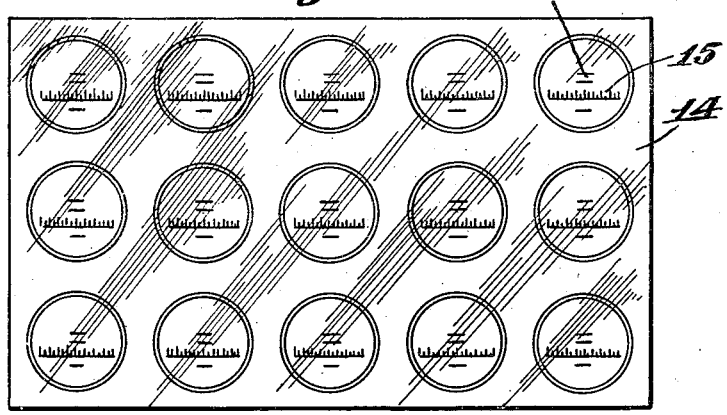
Fig. 3 is a top plan view of a glass plate having a multiplicity of finished reticles photographed thereon.
Figure 4:
Fig. 4 is a side edge elevation of the glass plate shown in Fig. 3.
Figure 5:
Fig. 5 is an isometric detail view of a finished reticle.

An illustrative but non-limiting example of the reticle design is shown in Fig. 3 photographically produced on a glass plate 14. It comprises a scale generally indicated at 15. In some instances this may constitute the entire reticle design used for sighting through a telescopic sight in a gun or in binoculars. However, any additional lines or designs may also be used such as parallel lines shown generally at 16. The reticles shown in multiple in this Fig. 3 are produced from a corresponding master negative as described above. When the photographic process has been completed the reticles produced thereby on the glass plate 14 may then be cut out to form individual reticles, as shown in Fig. 5. The peripheral edges of the reticle may be ground to obtain the desired reticle size.

Figure 6:
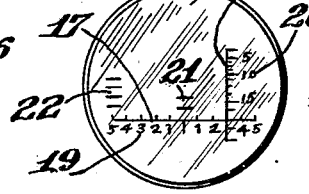
Fig. 6 is a plan view of a modified reticle design.

My invention is not limited to the specific reticle design shown in Fig. 5 but is applicable generally to any and all types of design, which are subject to photographic reproduction. An example of another design is shown in Fig. 6. It comprises a scale 17 extending across the reticle disk 11 parallel with and below the horizontal diameter thereof. This scale, as shown, is intersected by a right-angular scale 18 at the right of the vertical diameter of the disk 11. The divisions of the horizontal scale 17 are equal, but the divisions of the vertical scale 18 progressively increase in size from top to bottom. As shown, the divisions of the scales 17 and 18 are respectively numbered as at 19 and 20. In the same manner, the scale 15 of the reticle shown in Figs. 3 and 5 may be characteristically numbered or otherwise marked. In the reticle shown in Fig. 6 there are provided short horizontal parallel lines 21 coincident with the vertical diameter of the disk 11 and middle division line of the scale 17, while at the left end of said scale there is another series of short parallel lines 22.

The reticle body disks 11 may be of any conventional or approved shape, other than circular as shown; and the holder 10 accordingly modified to conform to and accommodate the disks. Instead of glass other transparent material may be used, provided it possesses the necessary refractive and other optical properties required for reticles. Some of the high quality transparent plastics, such as for example "Lucite" may possibly be used.

The light sensitive coating material used on the disks 11 or plate 13 is of such character that the portions of the coating unaffected by the light, during the photographic exposure and developing process, is removable by water or some other suitable solvent, but the portions that have been affected, and thus constitute the reticle design remain in permanent form on the glass and are markedly resistant to handling, even to the effects of heat, certain chemicals, and abrasion.

Various types of materials may be used to render the surface of the reticle body light sensitive, but for the specific purpose of making reticles, in accordance with my present invention, I have found it of advantage to use a material made according to the following formula:

*Formula*

| | |
|---|---|
| Water | ounces__ 32 |
| Glue | do____ 5 |
| Gelatin | grains__ 60 |
| Ammonium bichromate | ounces__ ¾ |

The procedure which I advantageously follow for preparing and using the above formula is as follows: The glass plate or disks, is covered with the above solution, then exposed to light and then developed in the usual way.

Next, a solution of acetic acid and water is flowed over the developed plate. This hardens the photographically produced image on the glass.

Following this, the plate is submerged in a dye solution comprised of the following:

| | |
|---|---|
| Du Pont Negrosine W. S. P. Powder Dye | ounces__ 6 |
| Du Pont Orange II Dye (conc.) | do____ 6 |
| Du Pont Negeria Black CX | do____ 6 |
| Acetic acid | do____ 2 |
| Distilled water | gallons__ 1 |

During this dye treatment the photographic plate is rocked or agitated to give uniform treatment of the photographic image. This requires about 30–45 minutes depending upon the temperature of the dye solution which may be from about room temperature or up to about 100° F.

Following this, the photographic plate is removed from the dye and placed in a solution of:

| | Ounces |
|---|---|
| Water | 24 |
| Potassium alum | ¼ | for a few minutes time. This increases the hardness of the photographic image.

The plate is then rinsed with water and dried and then baked slightly by application of heat either in the open or in an oven. Infra red light may be used to bake the photographic image more uniformly and reduce the risk of glass breakage.

Various modifications and changes may be made in the above described materials and methods without departing from the scope of my invention, some of the novel features of which are defined in the appended claims.

I claim:

1. A method of making an article suitable for use in an optical instrument comprising coating an article of glass or similar material with an aqueous solution of glue, gelatin and ammonium bichromate, exposing said coated article to light projected through a photographic negative of a reticle to produce a photographic positive of said reticle on said article, developing said photographic positive, and removing all other deposit of said light sensitive coating, washing said article with an aqueous solution of acetic acid to harden the photographic positive, subjecting said photographic positive to a dye solution for a substantial length of time to dye or darken said photographic positive, then washing it with alum to increase the hardness of the photographic positive, again washing with water, and finally heating the article to bake the photographic positive reticle to a permanent, non-soluble, abrasion resistant form, while leaving the entire remainder of the article uncoated and in clean transparent form.

2. A photographic method of producing reticles comprising coating a transparent body with a light sensitive, ammonium bichromate, gelatin, and glue composition, exposing the coating to a light projected image of fine lines to effect a reproduction of said lines on said transparent body, removing the unexposed areas of the coating, washing said transparent body with an acetic acid solution to effect hardening of said lines, and heating the acetic acid hardened lines to effect further hardening thereof, whereby a photographic positive reticle resistant to abrasion and solvents is produced on the transparent body.

EVERETT C. BIERMAN.